Feb. 4, 1958 R. LUCIEN 2,821,932
FLUID PUMPS OR ENGINES OF THE PISTON TYPE
Filed April 26, 1955 2 Sheets-Sheet 1
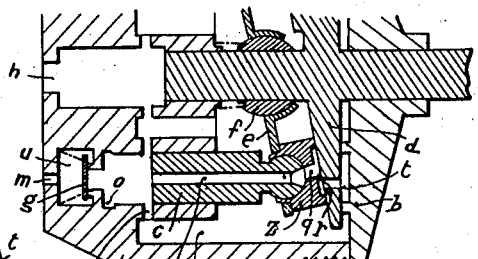

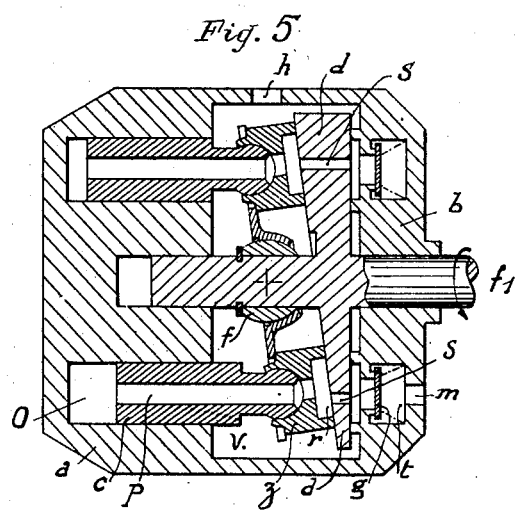
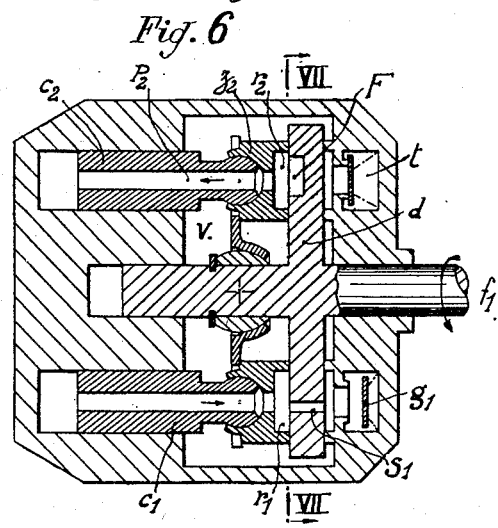
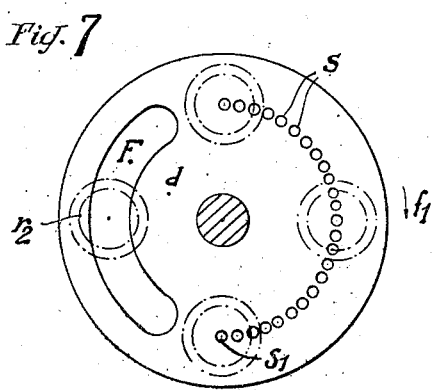

2,821,932

FLUID PUMPS OR ENGINES OF THE PISTON TYPE

René Lucien, Paris, France, assignor to Societe d'Inventions Aeronautiques et Mecaniques S. I. A. M. Fribourg, Switzerland, a societe anonyme Application April 26, 1955, Serial No. 503,931

Claims priority, application France April 28, 1954

5 Claims. (Cl. 103—173)

A large number of types of pumps having pistons and working on a fluid is in general use, in which the thrusts applied to the pistons (pumps) or exerted by the pistons (engines) are derived from members in movement, or are respectively applied to members which they set in motion. In these mechanisms, the surfaces in contact are sources of frictional forces which are often considerable, and which have the effect of giving a very low efficiency to the installation and result in rapid wear as well as an excessive consumption of fluid.

The present invention has for its object to provide a remedy for these serious drawbacks.

The invention is characterised by the means which it provides for reducing the surface pressure between members which are subjected to frictional forces. These means consist in forming in at least one of the movements subjected to frictional pressure, at least one cavity the edges of which are in continuous contact, over their entire extent, with the surface of the member which receives or transmits the pressure of the fluid, into which said cavity the fluid under pressure is admitted, thus creating between these two members pressures which act in opposition to each other.

The description which follows of an example of the application of the invention to a cylinder-pump will make it more readily understood and it will be clearly evident that the invention may similarly be applied to other machines employing a fluid, whether the fluid is put under pressure by the movement of the machine or whether the pressure of the fluid serves to drive the machine.

Amongst other applications, the description could be applied without any substantial changes, not to a pump, but to an engine of the same kind in which the fluid would be the driving medium.

In the drawings,

Fig. 1 shows in a cross-section a cylinder-pump of a known type, following a plane passing through the main axis and the axis of a piston at the moment when the latter is at its top dead centre.

Fig. 2 is a partial view in cross-section of the pump taken through the axis of a piston which is at bottom dead centre.

Fig. 3 is a front view of the plate $d$ of Fig. 1.

Fig. 4 is an alternative form of the embodiment shown in Fig. 1.

Figs. 5 and 6 show a further form of construction of a pump in accordance with the invention, in cross-section following two diametral perpendicular planes.

Fig. 7 is a view of the part $d$ taken along the line VII—VII of Fig. 6.

The cylinder-pump is made up of a pump body $a$, closed by a cap $b$, through which passes the shaft of the pump. In this pump body are bored cylinders in which are mounted pistons $c$, the axes of which are parallel to the rotating shaft. An inclined plate $d$ is rigidly fixed to the rotating shaft and, during its rotation, it acts on the heads of the pistons so as to drive them down into the cylinders, whilst a plate $e$, mounted with a swivel $f$ on the driving shaft, urges them back in the opposite direction. The fluid drawn in through the orifice $h$, passes in through the orifices $n$ into the base $o$ of the cylinders when the pistons are at their bottom dead centre (see Fig. 2) and is discharged by the latter through the non-return valves $g$ in the annular chamber $u$, from which it is expelled into the delivery pipe through the orifice $m$.

Between the spherical heads of the pistons and the inclined plate $d$ are interposed shoes $z$ the flat surface of which is constantly in rubbing contact with the inclined plate $d$ during its rotation.

In conformity with the invention, cavities $r$ are formed in the flat surface of the shoes $z$, the said cavities being led into communication with a conduit $p$ through the passage $q$, the conduit $p$ passing axially through the piston.

Orifices $s$ are pierced through the plate $d$ (see Fig. 3), these orifices being sufficiently close together and at a suitable distance from the main shaft in order that, at each instant, at least one orifice $s$ is located opposite a chamber $r$. Cavities $t$, similar to the cavities $r$, are formed in the cap $b$, in line with the pistons $c$.

If P is the pressure and $\Omega$ the useful surface area of the section of the piston and $\omega$ the surface defined by the internal edge of the cavity $r$, during the entire travel of the delivery stroke of the piston, the plate $d$ is subjected by the pressure of the fluid to a thrust $F=P(\Omega-\omega)$ the value of which becomes lower as $\omega$ becomes closer to $\Omega$. The value of $\omega$ will however be made fairly small in order that the thrust F may be sufficient to ensure fluid-tightness between the shoe $z$ and the plate $d$.

If $\omega'$ is the surface swept out by the internal edge of the cavity $t$, the thrust applied to the cap $b$ is in its turn partly compensated by the reaction of the fluid: $F'=P(\Omega-\omega')$. For the same reason of fluid-tightness, $\omega'$ will be chosen so as to be close to $\omega$.

It will be seen that, by virtue of the invention, the surface pressures on the parts in contact with the rotating plate are thus reduced to very small values. The shaft is then subjected to practically only the radial components due to the inclination of the plate $d$. The fact that the cavities $o$ and $t$ are caused to communicate through the piston $p$, the passage $q$ and the conduits $s$, enables an alternative form of construction of the pump to be envisaged. In this alternative form (see Fig. 4), the valve boxes are opposite to those previously shown, as are also the annular chamber $u$ and the delivery orifice $m$.

The pump shown in Figs. 5, 6 and 7, is similar to that shown in Fig. 4, except as far as concerns the inclined plate $d$ and the orifices in the bases of the cylinders through which the liquid is introduced.

Instead of being provided with transverse orifices $s$ distributed over its whole circumference, the inclined plate is now only provided with such orifices over one half of its circumference. Along the other half there is provided a milled slot F in the form of an arc of a circle, the extremities of which are separated from the end holes $s$ by a space which is roughly equal to the diameter of the chambers $r$ of the shoes $z$. Contrary to the orifices $s$, this milled segment does not pass through the thickness of the plate.

The operation of the pump is as follows:

If the piston $c$ (Fig. 5) is considered at the moment at which, in consequence of the rotation of the plate $d$ in the direction of the arrow $f_1$, it is about to move into its cylinder, it is seen that the fluid will be discharged through the conduit $p$ of the piston $c$, the chamber $r$ of the shoe $z$ and the orifices $s$, which cause this chamber to communicate with the corresponding chamber $t$ of the pump body $b$. The valve $g$ will be lifted and the fluid will escape through the delivery orifice $m$.

At the same instant, the piston $c_1$ (Fig. 6) is already at the mid-point of its delivery stroke, whilst on the other hand the piston $c_2$ is in the same position, but on its suction stroke. This occurs by virtue of the milled segment F of the inclined plate $d$, which, passing over the chamber $r_2$ of the shoe $z_2$, permits of the entry of the fluid coming from the suction chamber $v$, into the conduit $p_2$. This admission takes place as long as the chamber $r_2$ is associated with the milled segment F, that is to say until the first orifice $s_1$ comes into association with the entrance of the chamber $r_2$, at the moment at which the milled segment F leaves it. At this moment, the plate $d$ has made a quarter of a turn and the piston $c_2$ has taken up in its cylinder the position of the piston $c$ of Fig. 1. At the same moment, the latter has arrived at the mid-point of its delivery stroke in the position of the piston $c_1$ of Fig. 2.

It is found that, during their delivery phase, the mechanical pressures applied by the pistons to the inclined plate, and by the inclined plate to the body of the pump, are balanced, at least in part, by the pressure of the fluid, by virtue of the presence of the opposite chambers $r$ and $t$ which communicate with each other during this phase through the delivery orifices $s$ of the inclined plate $d$.

In order to simplify the explanation, a pump has been described having four pistons arranged at equal intervals around the axis of the pump, but the invention can, of course, be applied with the same results to a pump having any desired number of pistons, each one of which effects a suction stroke and a delivery stroke during one complete revolution of the plate $d$.

In the same way, the invention is also applicable to engines of the same barrel type, in which it is the admission pressure of the fluid which causes movement of the driven shaft to which the inclined plate is rigidly fixed.

What I claim is:

1. A fluid pressure transfer device comprising a casing having inlet and outlet ports, a plurality of parallel cylinders, pistons movable in the cylinders, said casing comprising, at an end thereof opposite said cylinders, a wall having a planar internal surface perpendicular to the cylinder axes, said wall providing a smooth bearing for a drive shaft rotatable relatively to the casing on an axis parallel to the cylinder axis, a plate mounted on the shaft for rotation therewith and having, on one side, a planar surface perpendicular to the shaft axis and, on the other side, an inclined surface, shoes having a planar surface in sliding engagement with said inclined surface, each shoe being mounted for universal movement on one of said pistons, means defining in the planar surface of each shoe a cavity communicating, through the body of the shoe and the piston, with the inside of the related cylinder, means defining on the internal surface of said end wall corresponding cavities facing said shoes, and a series of ports in said plate successively establishing a communication between the shoe cavities and corresponding wall cavities at least during the pressure stroke in the cylinders.

2. A device as in claim 1 comprising individual fluid inlet ports extending into said cylinders.

3. A device as in claim 2 wherein the inlet and outlet ports of the casing are located in a wall thereof remote from said end wall.

4. A device as in claim 2 wherein the inlet port of the casing is located in a wall thereof opposed to said end wall and wherein the outlet port of the casing is located in said end wall and communicates with the cavities of said end wall through a circular channel therein.

5. A device as in claim 1 wherein said series of ports in said plate extends over a half circumference corresponding to that portion of said plate which exerts pressure on the pistons, and wherein the inclined face of said plate free of said series of ports is provided with an arcuate groove registering at least partly and successively with said shoe cavities to establish a communication between the cylinders and the inlet port through said shoes and pistons during the intake stroke.

References Cited in the file of this patent

UNITED STATES PATENTS

| | | |
|---|---|---|
| 2,608,159 | Born | Aug. 26, 1952 |
| 2,699,123 | Bonnette et al. | Jan. 11, 1955 |
| 2,709,339 | Edelman et al. | May 31, 1955 |